May 17, 1955

H. F. WELSH ET AL 2,708,554

TAPE DRIVE AND RECORDING APPARATUS

Filed July 29, 1950

4 Sheets-Sheet 1

INVENTORS.
HERBERT FRAZER WELSH
LEON ROBERT MOCK
EDMUND D. SCHREINER
JOHN PRESPER ECKERT JR.

George V. Eltgroth
ATTORNEY

May 17, 1955 H. F. WELSH ET AL 2,708,554
TAPE DRIVE AND RECORDING APPARATUS
Filed July 29, 1950 4 Sheets-Sheet 2

INVENTORS.
HERBERT FRAZER WELSH
LEON ROBERT MOCK
EDMUND C. SCHREINER
JOHN PRESPER ECKERT JR.
George V. Eltgroth
ATTORNEY May 17, 1955 H. F. WELSH ET AL 2,708,554

TAPE DRIVE AND RECORDING APPARATUS

Filed July 29, 1950 4 Sheets-Sheet 3

SERVO LOOP CONTROL DEVICE

*INVENTORS*
HERBERT FRAZER WELSH
LEON ROBERT MOCK
EDMUND D. SCHREINER
JOHN PRESPER ECKERT JR.

BY [signature]
*ATTORNEY*

May 17, 1955 H. F. WELSH ET AL 2,708,554

TAPE DRIVE AND RECORDING APPARATUS

Filed July 29, 1950

4 Sheets-Sheet 4

INVENTORS.
HERBERT FRAZER WELSH
LEON ROBERT MOCK
EDMUND D. SCHREINER
JOHN PRESPER ECKERT JR.

ATTORNEY

United States Patent Office 2,708,554

Patented May 17, 1955

2,708,554

TAPE DRIVE AND RECORDING APPARATUS

Herbert Frazer Welsh, Edmund D. Schreiner, and Leon Robert Mock, Philadelphia, and John Presper Eckert, Jr., Gladwynn, Pa., assignors, by mesne assignments, to Remington Rand Inc., New York, N. Y., a corporation of Delaware Application July 29, 1950, Serial No. 176,722

4 Claims. (Cl. 242—75)

Figure 1:
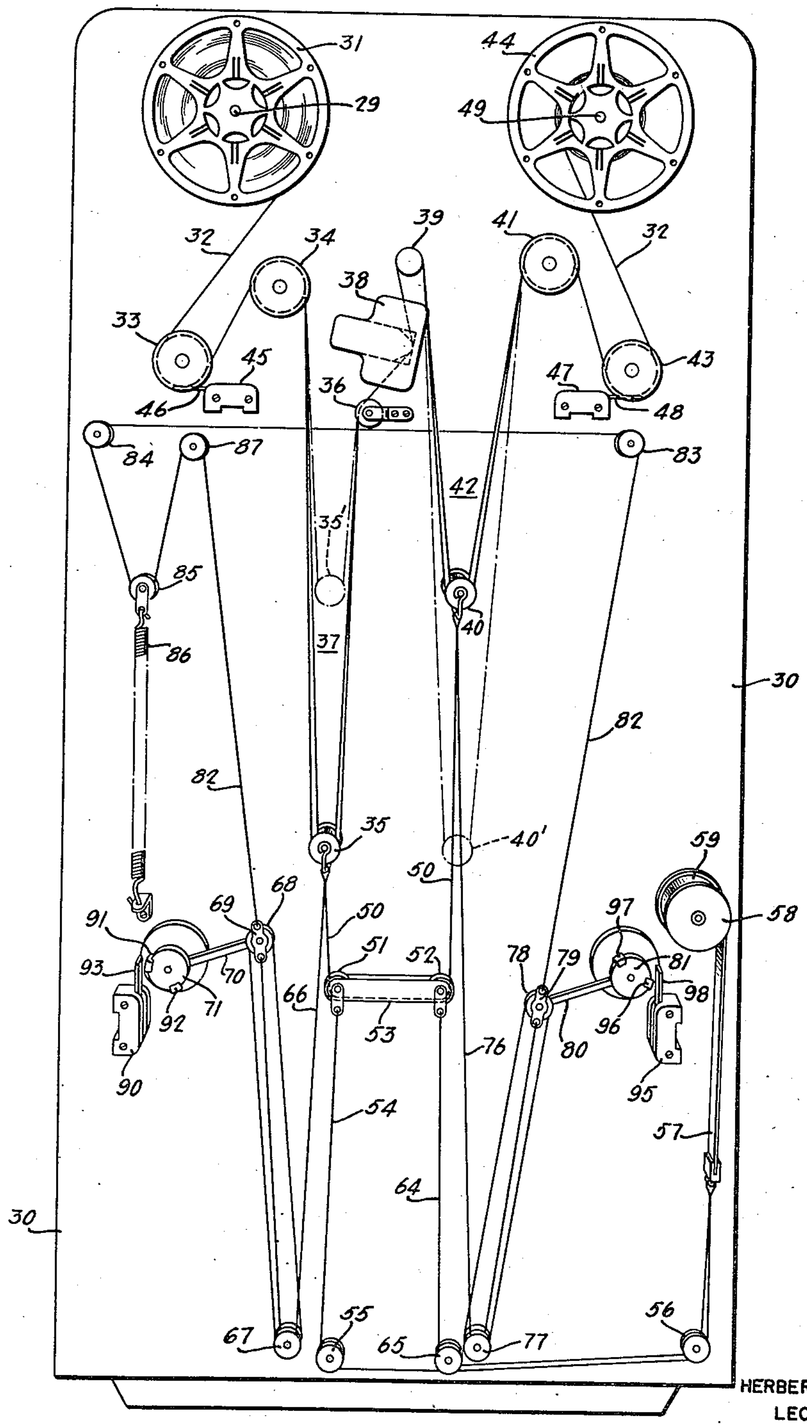

This invention relates to driving systems for flexible elongated members, and more particularly to a method of and apparatus for rapidly starting and stopping reading from and recording upon such members.

Realization of the potentialities of large scale, high speed digital computers requires economical and readily available storage systems for large quantities of digital information. The recordation of information upon a magnetically susceptible tape provides an efficient means of storing information. To maintain computer efficiency it is necessary that a tape driving apparatus be capable of receiving information in blocks, as it issues from the computer at a high rate of speed, starting and stopping between blocks. It is, therefore, essential that the tape be quickly accelerated to a desired recording speed from its inoperative state when information is available for recordation, and be decelerated equally rapidly at the end of the block. This is likewise necessary when the information is being delivered from a tape to a computer (reading).

In general, greater efficiency of operation can be effectuated by use of a highly versatile tape driving and recording apparatus for tape actuation in the forward, or backward directions while either recording or reproducing information, and also providing convenient and rapid tape rewind. The employment of a plurality of such tape driving and recording units capable of operating simultaneously to the extent of permitting the recordation of information by one unit while another is delivering recorded information and any number of other units are rewinding, not only provides a limitless information storage capacity, but enlarges the accessibility of recorded information while still further increasing information input-output capacity of the apparatus.

It is noted that the invention is not limited to the driving of magnetically susceptible tapes but includes all elongated flexible members. Neither is it intended that the scope of the invention be limited by its adaption for use in computing apparatus.

Accordingly, it is a principal object of the invention to provide new and improved tape driving apparatus capable of rapidly attaining desired driving velocities adjacent a given location, especially when periodically actuated.

Another object of the invention is to provide a new and improved method of and means for most efficiently delivering tape to and removing tape from a rapidly accelerating and decelerating tape driving means.

Still another object of the invention is to provide a new and improved method of and means for delivering tape to and removing tape from a driving device, which minimizes the driving load, especially during acceleration and deceleration.

A further object of the invention is to provide a tape reeling system which does not tend to displace the tape section adjacent a given location except upon the actuation of an associated tape driving means.

Yet another object of the invention is to provide new and improved tape driving and recording apparatus capable of performing a plurality of driving and recording operations.

Yet a further object of the invention is to provide apparatus embodying new and useful safety features automatically minimizing damage to equipment upon the occurrence of certain operational abnormalities.

Another object of the invention is to provide a device adjusting the tape loops intermediate supply and take-up reels to a size which is a function of the direction in which the tape is to be driven and the acceleration of the driving means.

Yet another object of the invention is to provide a novel and improved method of and apparatus for minimizing the peak accelerating power requirements in a tape feeding system.

Still another object of the invention is to provide a novel and improved low inertia tape reeling system suitable for meeting rapidly varying tape requirements.

A further object of the invention is to provide a new and improved motor control system producing high acceleration rates for changing from one operating state or velocity to another while affording maximum controllability.

Still another object of the invention is to provide an electrical circuit utilizing an amplitude modulated signal in a single phase sense to determine an absolute positional relationship to be assumed by a rotating body.

The novel features have been embodied in the tape handling system described herein, which may be conveniently considered separately in its mechanical and electrical aspects, although the two are intimately related.

From a mechanical standpoint, the tape handling system includes take-up and supply reels, coupled to a high speed tape drive through slack loops. The high speed tape drive is capable of very rapid acceleration and deceleration, as it handles a relatively short length of very thin tape with very little mass. The high acceleration and deceleration rates cannot be matched by the more massive supply and take-up reels, so the slack loops are interposed to serve as tape reservoirs during the time required for the supply and take-up apparatus to come up to an equilibrium speed. The size of the slack loops is controlled by a loop sensing device acting through a servo network controlling the associated supply or take-up motor to maintain the slack loop within predetermined size limits. Provision is made for adjusting the size of the slack loops in anticipation of the expected sense of operation of the high speed tape drive, the loop associated with the supply reel being enlarged and the take-up loop diminished in size when the tape is to be driven in a forward direction, and conversely when the tape is to be driven in reverse, as during a rewind operation. Random migration of the tape between supply and take-up loops when the high speed tape drive is deenergized is avoided by the application of loop tension through an equalizer bar to prevent tension differentials on the two loops.

The high speed starting and stopping characteristics of the tape drive particularly adapt the device for recording and delivering information in short bursts with little waste of time. Realization of these advantages requires complementary design of the electrical control circuits to incorporate high speed relays and apply auxiliary starting power surges and motor plugging power. High speed starts are further facilitated by operating the tape drive motor at less than synchronous speed under the control of a speed governing servo systems. Delay is automatically provided when required for adjustment of the size of the slack loops.

Figure 2:
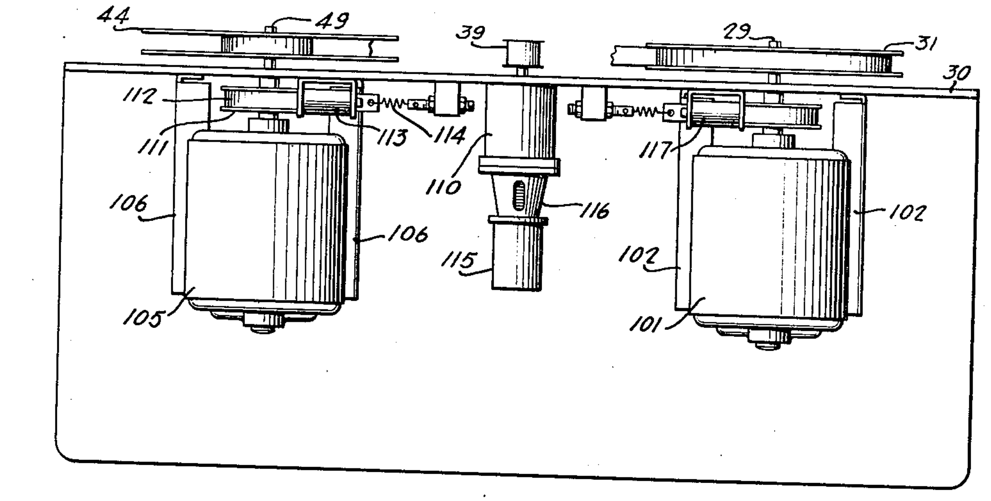
Figure 3:
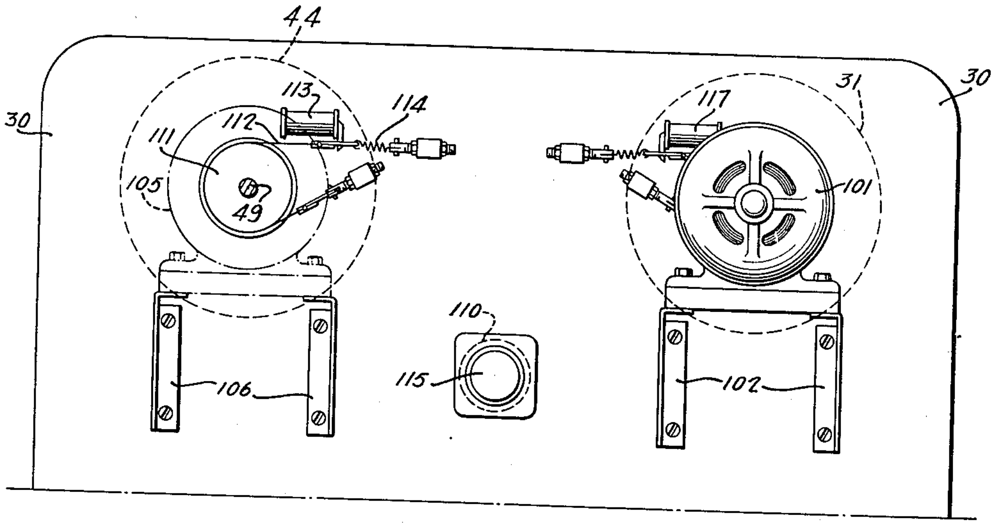
Figures 4, 5, 7:
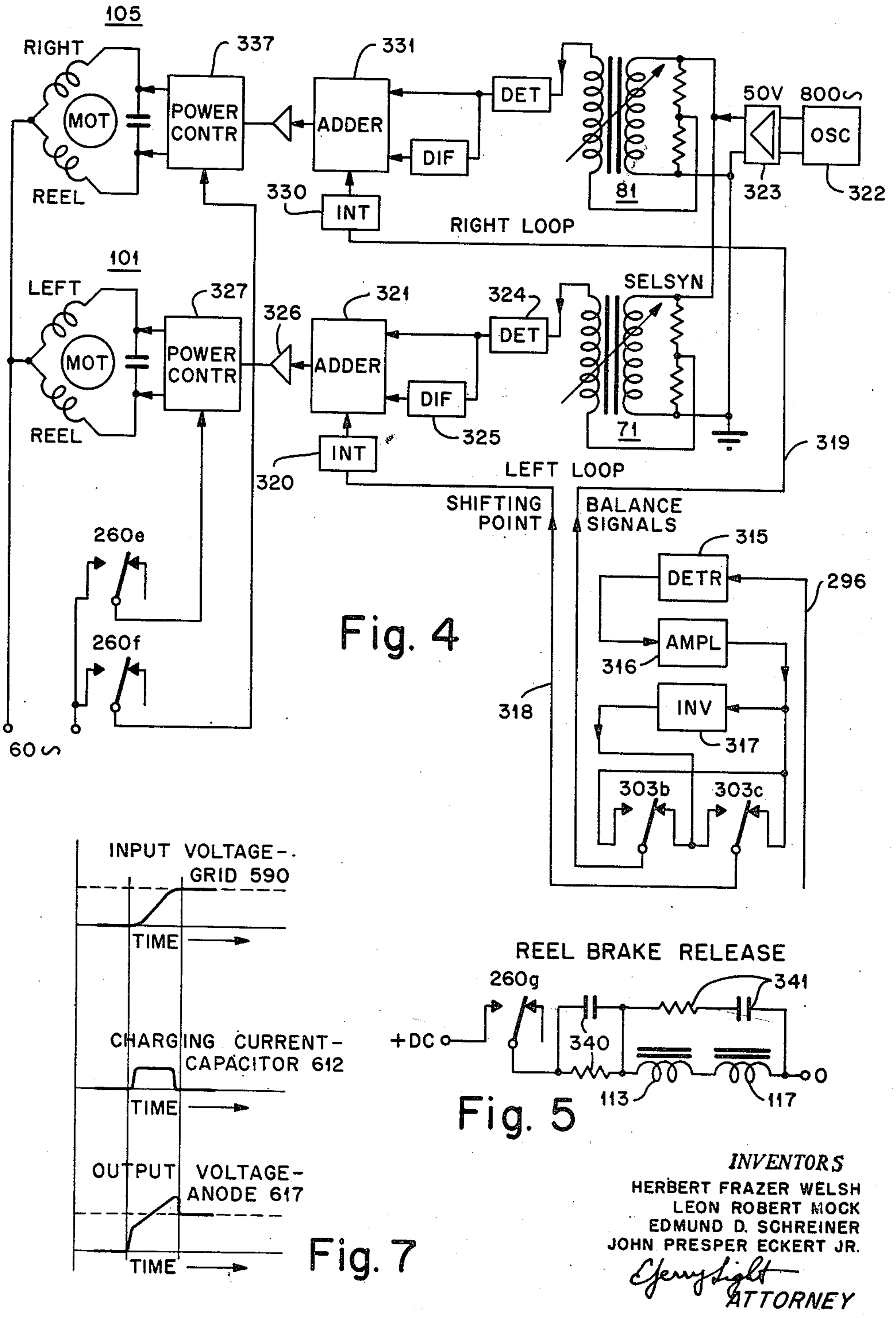
Figure 6:
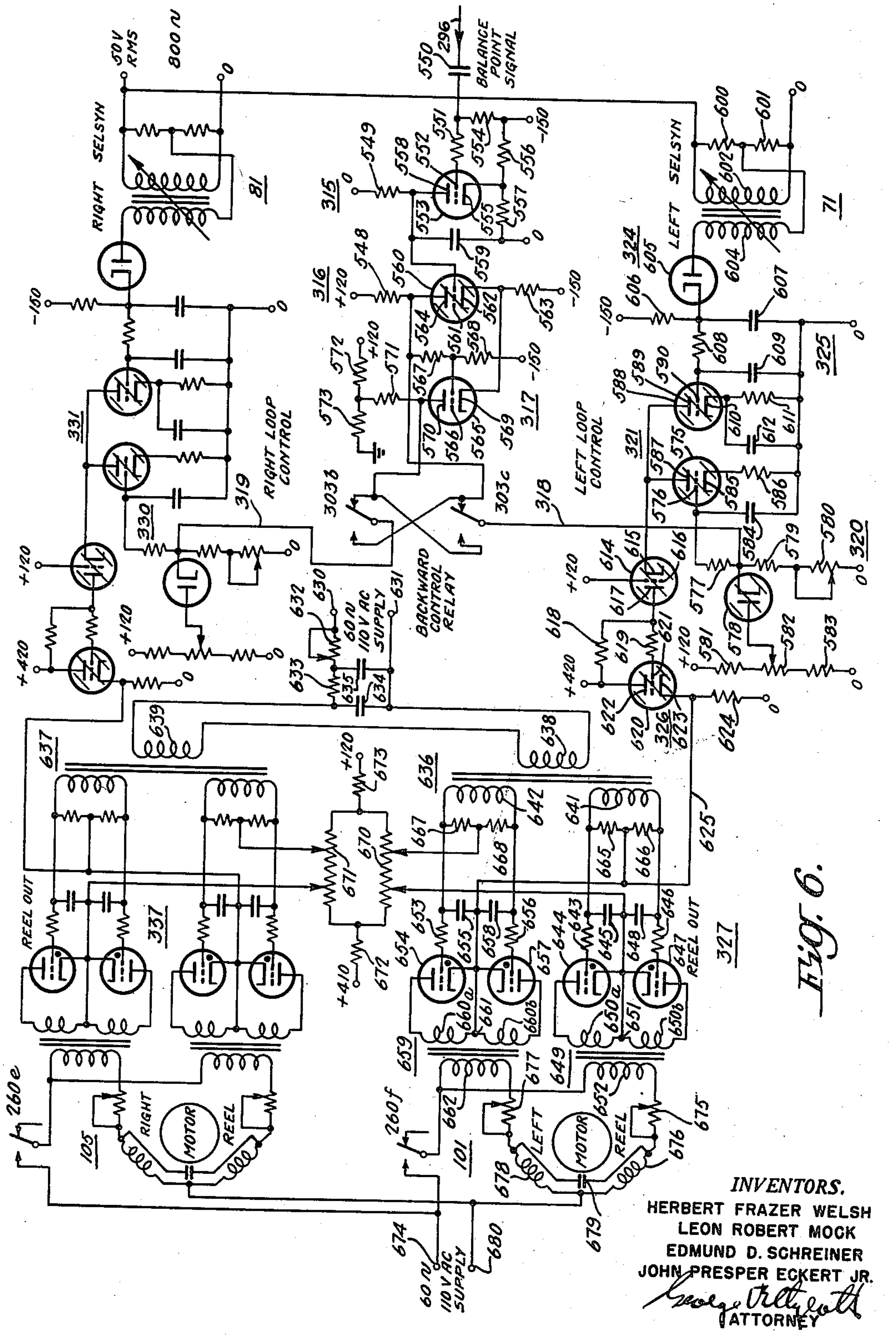

The above and further objects and aspects of the invention will become more apparent from the following detailed description taken in reference to the accompanying drawings in which:

Figure 1 is a front elevation view of a tape handling unit employed in the reading and writing process, Figure 2 is a plan view of the tape handling unit shown in Figure 1, Figure 3 is a rear elevation view of the upper portion of the tape handling unit shown in Figure 1, Figure 4 gives a block diagram of the servo loop control device, Figure 5 illustrates the reel brake release, Figure 6 illustrates schematically the servo system controlling the tape supply and take-up loops of the tape handling unit, Figure 7 illustrates graphically the signal voltages at selected locations in the loop control circuit of the servo device shown in Figure 6.

In the annexed drawings, like parts are identified by like reference characters and values of potential are given for purposes of illustration only and not in order to limit the scope of the invention. Heaters, heater circuits and power supplies, generally, have been omitted to promote simplicity, it being understood that any well known systems or circuits may be used for this purpose.

The general disposition of the tape handling elements in the apparatus is illustrated in Figure 1. A tape storage reel 31 is rotatably mounted upon a front panel 30 and bears a supply of tape 32 susceptible to magnetic recordation. The tape 32 leaving the supply reel 31 is threaded over a path including idler guide wheels 33, 34, loop tension pulley 35, head guide wheel 36, the read-write head 38, the center drive wheel 39, loop tension pulley 40, and idler guide wheels 41 and 43, the latter delivering the tape to the take-up reel 44, also rotatably mounted on the panel 30. The tape included between the idler guide wheels 34 and 36 forms a supply loop 37, while the tape included between the center drive wheel 39 and idler guide wheel 41 forms a take-up loop. The engaged face of the center drive wheel 39 is faced with material having a high coefficient of friction to better drive the tape. The idler guide pulleys 33, 34, 36, 41, and 43 are all mounted upon the front panel 30 to be freely rotatable about their axes. The idler guide wheel 33 is associated with a thickness responsive forward tape limit switch 45 having an arm 46 in engagement with the tape 32. A thickness responsive backward tape limit switch 47 having an arm 48 is associated in a like manner with the idler guide wheel 43. Referring briefly to Figure 2, it is seen that the tape storage reel 31 is mounted on the shaft of the reel motor 101, secured to the rear face of the panel 30. Likewise, the right tape storage reel 44 is mounted on and driven by the reel motor 105. The projecting shaft of a low inertia center drive motor 110 mounted on the rear of panel 30 bears the center drive wheel 39.

Referring now to Figure 1, the pulley blocks of the loop tension pulleys 35 and 40 are joined by an equalizer cord 50 which passes around a pair of equalizer bar pulley wheels 51 and 52 which are spaced by and supported at the extremities of an equalizer bar 53, so that the loop tension pulleys 35 and 40 may move relative to each other, one moving upward when the other is moving downward, while permitting the equalizer bar 53 to remain stationary with relation to the front panel 30. The end of the equalizer bar 53 rotatably supporting the pulley 51 is connected to a tension cord 54 which passes over the outboard wheels of the double tension cord pulleys 55, 65, and 56 to connect to the end 57 of a main tension spring of the constant rate type which has a remaining portion 59 coiled about a mainspring idler wheel 58. The other extremity of the equalizer bar 53 supporting the pulley 52 is likewise joined by a tension cord 64 to the end 57 of the main tension spring, extending around the inboard wheels of the double tension cord pulleys 65 and 56. The main tension spring exerts equal force upon both extremities of the equalizer bar 53 through the tension cords 54 and 64 maintaining the equalizer bar in a horizontal position and also tensioning the equalizer cord 50 passing around the bar pulleys 51 and 52. The equalizer cord in turn exerts equal tensioning force upon the loop tensioning pulleys 35 and 40, any tensional difference being equalized by the motion of the equalizer cord around the equalizer bar pulleys 51 and 52. Thus, equal tensional force is exerted upon the tape loop 37 and tape loop 42 by the loop tensioning pulleys 35 and 40, respectively, through the action of the equalizer cord 50, said tensional force also being maintained constant by downward or upward motion of the equalizer bar 53 under the influence of the main tensioning spring, exerted through the tension cords 54 and 64. It should be observed that motion of the equalizer bar 53 in the upward or downward direction occurs only when the motion of one of the loop tensioning pulleys 35 or 40 is not complemented by an opposite and equal motion of the other loop tensioning pulley. For example, if the loop tension pulley 35 maintains the solid line position of Figure 1 and the loop tension pulley 40 moves to the dashed line position 40', the equalizer bar 53 will move in a downward direction a distance equal to half the distance travelled by the loop tension pulley 40 to its new position 40'. This shows that the equalizer bar 53 will move only upon occasion of unequal motions of the loop tension pulleys 35 and 40, such resulting motion being only one-half the unequal motion of said pulleys and in the direction of such inequality. Normally, pulleys 35 and 40 move in complementary manner, leaving the position of equalizer bar 53 unchanged. Obviously, under these conditions, the equalizer bar, which affords a point of connection for the establishment of tension, contributes no additional inertia to the moving system. Even when the motion is not complementary the reduced motion of the equalizer bar greatly reduces the inertia reflected into the moving system. The use of the equalizer bar 53 with its associated pulleys 51 and 52 has been found of great advantage over the use of a simple pulley by its contribution to better operating characteristics and stability, minimizing undue vibration and undesirable undulations.

The self-synchronous transformers 71 and 81 serve as a pair of loop position sensing units and are individually associated with a servo loop control device to be later described in detail. These units are respectively coupled to the pulley blocks of the loop tension pulleys 35 and 40. The loop position sensing unit 71 is actuated by a cord 66 connected to the block of loop tension pulley 35 through a three-to-one reduction pulley system including a pulley 67 secured to the panel 30 and a pulley 68 secured to the end of the arm 70 of the selsyn 71. The motion of the selsyn pulley 68 is, therefore, only one-third as great as the corresponding motion of its associated loop tension pulley. The arm 80 of the selsyn 81 is joined to the loop tension pulley 40 in a manner similar to that just described by means of the cord 76 through selsyn pulley 78 and reduction pulley 77 effecting a like reduction ratio.

Restoring force is applied to the selsyn arms 70 and 80 by a cord 82 connecting the two and passing over the idler pulleys 83, 84, and 87, rotatably mounted on the panel 30, and maintained under tension by the action of a spring 86 anchored at one end to the panel 30 and provided at its other end with a tension pulley 85 riding on the cord 82.

The pulley reduction system driving the selsyn arms reduces the arm motion for a given displacement of the loop tension pulleys 35 and 40, and delivers a greater actuating force to said arms 70 and 80, thereby reducing the effective mass associated with the loop tension pulleys 35 and 40 connected thereto through cords 66 and 76 respectively. The tension exerted by the cord 82 upon the blocks 69 and 79 of selsyn pulleys 68 and 78 causes the arms 70 and 80 to follow the positions of the respective loop tension pulleys 35, 40. This force is reduced on transmission to the loop tension pulleys 35 and 40 through the associated reduction system. The force on each pulley is equal, avoiding system unbalance. Obviously, after the three-fold reduction, the auxiliary force exerted by the cord 82 is small by comparison with the tension developed at the loop pulleys 35, 40 by the main tension spring 57.

The selsyn 71 has associated therewith a supply loop limiting switch 90 having an arm 93 actuated by limit cams 91 and 92 driven from the selsyn arm 70. Thus, if the loop tension pulley 35 were to continue to move downward, the selsyn arm 70 would rotate counterclockwise bringing the limit cam 91 to a position actuating the arm 93 of the limit switch 90. The operation of the limit switch 90 upon actuation of the arm 93 will later be described in detail. The limit cam 92 actuates arm 93 when the loop tension pulley 35 moves upwardly beyond the position indicated by 35'. Only under abnormal conditions will the loop tension pulley 35 move to the extreme positions actuating the loop limit switch 90. The normal operating range of said loop tension pulley 35 is between the extremes indicated.

A take-up loop limit switch 95 having an arm 98 is actuated by the limit cams 96 and 97 associated with the selsyn 81 and driven by the selsyn arm 80 which is responsive to the position of the loop tension pulley 40 and operates in similar fashion. Thus, if the loop tension pulley 40 moves upward from the position shown, the selsyn arm 80 rotates counterclockwise, causing the actuation of the limit switch 95 by the limit cam 96. The limit switch 95 also operates when the loop tension pulley 40 moves downward beyond the position 40' indicated by dashed lines, actuation of the switch 95 being effected by the limit cam 97 in this case. The limit switches 90, 95, as apparent from the drawing in Figure 1, operate independently of each other and are actuated when their respective loop tension pulleys assume positions beyond their normal operating positions.

To describe the operation of the tape handling apparatus of the read-write unit, it should first be noted that the tension exerted upon the loop tensioning pulleys 35 and 40 being equal, there will be no tendency of the tape 32 to move from one loop 37 to the other loop 42, or in the opposite direction, to equalize unequal tensions, which would rotate the center drive wheel 39. Thus, it is apparent that no translation of tape 32 can be effected from one loop to the other except upon displacement of tape 32 by the center drive wheel 39. This effect is very desirable because tape is only to be moved over the read-write head 38 when tape is displaced by powered rotation of center drive wheel 39. The tensioning of the loops 37 and 42 also serves to maintain the tape 32 in good contact with the center drive wheel 39 and the read-write head 38. This tension if excessive results in increased tape wear and friction, which should be avoided.

It is thus apparent that, when the center drive wheel 39 is inactive, the only manner in which the loops 37 and 42 may have their size varied is by having tape 32 added thereto or removed therefrom by the corresponding tape storage reel 31 and 44, respectively. Assuming now that the tape handling system is to operate in a forward direction, that is, with tape being supplied by the tape storage reel 31 and taken up by the tape storage reel 44 the loops 37 and 42 are adjusted to assume positions substantially as shown in Figure 1 before the center drive wheel 39 is actuated. The solid line position of the loop tension pulleys 35 and 40 is assumed whenever the tape is to be driven in the forward direction. A corresponding, but mirror image, position is assumed by the loop tension pulleys 35 and 40 prior to tape actuation by the center drive wheel 39 in the backward direction when the tape is to be driven in the opposite or backward direction. This point position is indicated by pulley positions 35' and 40'. It should be noted that the loop tension pulleys 35 and 40 may be shifted from one of these positions to the other without the least motion of the equalizer bar 53, as the tape transfer is complementary.

Inasmuch as the size of the tape take-up and supply loops is governed in the completed apparatus by a self-balancing servo system, and the respective tape loop positions illustrated correspond to balanced condition in the associated servo system when set for forward and reverse drive, they may be referred to as the forward balance point position (solid line) and the reverse balance point position (dashed line).

If, with the loop tension pulleys 35 and 40 in the forward balance point position, the center drive wheel 39 is actuated in the forward or clockwise direction, assuming its steady state rotational velocity in the short period of time corresponding to a high accelerating rate, tape is removed from the left loop 37 at a greater rate than it is replaced, causing this loop to diminish in size, whereas tape is delivered to the right loop 42 at a greater rate than it is removed, so that this loop is increased in size. The difference between the performance of the center drive and the supply reels is a result of the different starting characteristics of the two systems, arising from the different inertias involved. Upon the actuation of the center drive wheel 39, tape is supplied to the left loop 37 by the tape storage reel 31 under the control of the servo system. However, the initial rate of such supply is lower than the rate of tape removal from said loop 37 by the center drive wheel 39. At the same time, the storage reel 44 removes tape from the right loop 42, the initial rate of removal being lower than the rate at which tape is supplied to the loop 42 by the center drive wheel 39. Because of this, immediately upon the actuation of the center drive wheel 39, the loop 37 decreases while loop 42 increases in size, such increase and decrease continuing while the supply motors accelerate until the loop tension pulleys 35 and 40 assume the second balance point position indicated by 35' and 40', at which time the tape storage reel 31 is supplying tape at a rate equal to its removal by the center drive wheel 39 and the tape storage reel 44 is removing tape from the loop 42 at a rate equal to its supply by the center drive wheel 39. This balance point position is maintained by the pulleys 35 and 40 as long as the center drive wheel continues in its forward direction, without deceleration. During deceleration of the center drive wheel 39, the loop 37 enlarges in size while the loop 42 becomes smaller, so that the first balance point position is resumed by the loop tension pulleys 35 and 40 when the center drive wheel 39 stops, after which the supply reel servo system halts the supply reels.

From the preceding operative description, it is apparent that the loops 37 and 42 function as tape storage loops isolating the slowly accelerating tape supply system from the rapidly accelerating center drive. By this method the center drive wheel 39 having a high accelerating rate may be supplied with tape by means having a much lower tape supply accelerating rate. Acceleration and deceleration of the tape storage reels 31 and 44 must be limited to a lower rate because of the mass of such a unit storing a large quantity of tape would require objectionably high torque to accelerate it at the same rate at which the low inertia type center drive wheel 39 is accelerated. Further, the forces involved in such high acceleration rates for the storage reels, might damage the tape by cinching or unreeling. By using the loops 37 and 42 a longer period of time is made available for the acceleration of the reels 31 and 44 to achieve a tape delivery or take-up rate corresponding to the speed of the center drive wheel 39. It should be further noted that by positioning the loops 37 and 42 for driving in the forward direction in the manner indicated in Figure 1, so that loop 37 is initially larger than loop 42 instead of making them equal to each other, the respective storage capacities of said loops are enhanced for operation in the forward direction, doubling their efficiency.

A like efficiency is achieved by positioning loop tensioning pulleys 35 and 40 in the dashed line positions 35′ and 40′, respectively, so that loop 42 is initially larger than tape loop 37, when the tape is to be driven in a backward direction. Thus, when operating in the backward direction the tape loop 42 decreases in size while the tape loop 37 increases in size after the center drive is energized until the other balance point position is assumed for steady state backward drive.

Another characteristic of operation should be noted in that, when the center drive wheel 39 is intermittently accelerated and decelerated, the periods involved may be so small that loop tensioning pulleys 35 and 40 do not assume the final positions for steady state operation or resume their initial position after a period of deceleration. Upon such circumstances the pulleys 35 and 40 will assume positions intermediate between their initial positions and their steady state operating position. For example, with a fifty-fifty work cycle, the loop tension pulleys 35 and 40 may assume positions halfway between the initial and steady state positions. Thus, the loop sizes will be maintained at an average size corresponding to the duty cycle and periods of operation involved. The operation of the system under such circumstances, whereby an average position is assumed by the loop tension pulleys 35 and 40, maximizes efficiency and helps to minimize vibrations, oscillations, and system instability.

The Figures 2 and 3 show the reel motors 101 and 105 respectively supported by brackets 102 and 106 attached to the rear surface of the front panel 30, Figure 3 not showing the motor 105 to better illustrate a safety braking system. Each of said motors has associated therewith a reel brake. The brake system for motor 105 comprises a brake drum 111 affixed to the motor drive shaft 49 of the right reel motor 105, a brake band 112 extending around the periphery of said brake drum 111 having one end anchored to the panel and the other end connected to a band tensioning spring 114 which urges the brake band 112 into engagement with the brake drum 111 and a brake band actuator 113. Under these conditions, sufficient frictional force is obtainable for securing the desired braking action of the tape storage reel 44 and reel drive motor 105. When energized, the actuator 113 exerts a force opposing the brake band tensioning spring 114 and reduces the friction between the brake band 112 and the brake drum 111. Thus, driving power may be applied to the tape storage reel 44 by the tape drive motor 105 when the actuator 113 is energized. It is to be noted that when the actuator 113 is de-energized, the braking action of the band 112 most effectively retards rotation of the tape storage reel 44 in the tape reeling out direction, because in this case the brake drum 111 exerts a force upon the anchored end of brake band 112, not the movable end. This distinction is important because best braking is required when the reel has been actuated in the reeling out direction, to prevent the accidental unreeling of large quantities of tape in case of a failure. A like braking system with similar features is provided for the left reel drive motor 101, which need not be described in detail because of its similarity of construction and operation with the safety brake associated with tape drive motor 105.

Figure 4 is again referred to for consideration of a servo loop control device comprising a left loop selsyn 71 associated with a left reel motor 101, and a right loop selsyn 81 associated with a right reel motor 105, which have been illustrated in their mechanical aspects and functionally described in connection with Figures 1, 2, and 3. The servo loop control device may be divided into two parts which are substantially identical to each other; one associated with the left reel motor 101, and the other associated with the right reel motor 105. Therefore, what is said about the left loop control can be considered applicable to the right loop control of the servo loop control device. The left selsyn 71 and the right selsyn 81 have their primary windings connected in parallel to receive a fifty-volt 800 cycle per second signal from an amplifier 323 driven by a signal oscillator 322. The secondary winding of the selsyn 71 receives a reference signal by having one end connected to the junction point of two resistors connected across the output of amplifier 323. The other end of the secondary winding delivers a signal induced in the secondary from the primary winding of the selsyn 71. This signal is delivered through a detector 324 to an adder 321, which also receives a differentiated signal through the device 325 connecting with the detector 324. The adder 321 receives a shifting balance point signal through an integrator 320 from the line 318. The line 318 is energized by signals appearing on the line 296. These signals on line 296 are delivered by the central power lines to the center drive apparatus for center drive actuation. The signals derived from the line 296 are, however, first delivered to a detector 315 which excites an amplifier 316. Amplifier 316 in turn drives an inverter 317 and excites the line 318 through the backward relay contacting group 303*c* in its de-energized position. The excitation passes from the right-hand contacting member to its associated armature which is joined to line 318. The amplifier signal is also delivered to the left-hand contacting member of the backward relay contacting group 303*b*. The output signal from the inverter 317 is delivered to the left-hand contacting member of the backward relay contacting group 303*c* and to the right-hand contacting member of the backward relay contacting group 303*b*. When the group 303*b* is de-energized, the line 319 which is joined to the armature of that group receives excitation from the inverter 317. The inverter signal is delivered by line 319 through an integrator 330 to the adder 331 of the right control of the servo device. Thus, when the backward thyratron 302 is extinguished and the relay 303 is de-energized an amplified detected signal from the center drive apparatus will be delivered to the adder 321 of the left control, and an inverted signal will be delivered to the adder 331 of the right loop control servo device. When a backward operation is to be performed, and the backward thyratron 302 is fired, the backward relay contacting groups 303*b* and 303*c* are energized to reverse signals delivered to the respective adders 321, 331, of the servo loop control device. The function of this reversal is to accomplish a shifting balance point operation preparatory to center drive operation. A signal delivered to the detector 315 when center drive power is delivered causes shifting of the loops to their steady state operating position during tape driving.

The adder 321 combines input signals and delivers the resultant through the amplifier 326 to the power control 327. The power control 327 determines whether or not driving power is to be supplied to the left reel motor 101. If power is to be supplied, power control 327 determines the direction in which the reel motor 101 is to be driven. If power is delivered at the upper output of the power control 327 the upper winding of the left reel motor 101 is placed in parallel with the series combination of a capacitor and the reel motor lower winding. If power is supplied by the lower output of the power control 327, the upper winding of the reel motor is effectively in series with the capacitor and in parallel with the lower winding of the reel motor. The direction in which reel motor 101 rotates depends upon whether the upper or lower output receives power. The left and right reel motors 101, 105 receive sixty C. P. S. alternating current from the unit power supply. This is achieved by returning the upper and lower windings of the reel motors 101, 105 at their respective junctions to one terminal of the power supply. The other ends of the windings are delivered to the second power terminal through the power controls 327, 337 and by main interlock contacting groups 260e and 260f, respectively, when in their actuated positions. In this manner power for driving the reel motors 101, 105 is applied or removed by action of the main unit interlock as previously described in detail.

The actuators 113 and 117 associated with the motor reel braking systems shown in Figures 2 and 3 are connected in series with each other and in parallel with a protective branch 341 comprising a series resistor and capacitor as illustrated in Figure 5. One end of the actuator coil 117 is returned to a positive D. C. voltage of the unit power supply through a resistor-capacitor combination 340 going to the armature of the main interlock relay contacting group 260g. When this group 260g is in the energized position, its armature contacts the left-hand member which is in turn joined to a positive D. C. potential source. The function of the actuators 113, 117 each associated with a reel motor, as previously stated, is to release the associated brake bands when they are energized. On the other hand, the brakes are applied when the actuators are not energized either due to normal conditions or due to abnormal operating conditions (such as by operation of safety switches as, for example, switches 90 and 95 of Figure 1, in which case application of the reel brakes may prevent extensive damage to the equipment and the tape which otherwise might continue to unreel).

Figure 6 illustrates schematically in greater detail the servo loop control device shown diagrammatically in Figure 4. Figure 6 gives, in addition to the reference numerals for the schematic details, the reference numerals for the block items of Figure 4. Since the right and left loops are substantially identical, only the left loop control of the servo loop control device will be described. Reference will be made to the right loop control only when this is required for an adequate description of the servo loop control device. The power signals appearing upon line 296 associated with the center drive apparatus are delivered through a coupling capacitor 550 in series with a resistor 551 to the control electrode 552 of the detector valve 553. The control electrode 552 is negatively biased by returning to a potential of minus 150 volts through the resistor 551 and a grid resistor 554. The cathode 555 of the detector valve 553 is likewise returned to a negative potential by joining the junction point of voltage dividing resistors 556 and 557 which are returned respectively to the negative potential of 150 volts and a potential of zero volts. The anode 558 of the detector valve 553 is directly linked to control electrode 561 of a normally conducting amplifier valve 560 and is returned to zero potential by both an anode resistor 549 and parallel charging capacitor 559.

The amplifier valve 560 has its cathode 562 returned to a negative potential of approximately 150 volts through a cathode resistor 563. Its anode 564 is connected to a positive potential of approximately 120 volts through an anode resistor 548 and is linked to the right hand contacting member and the left hand contacting member, respectively, of the backward relay contacting groups 303c and 303b.

An inverter valve 565 receives excitation upon its control electrode 566 from the anode 564 of the amplifier valve 560 through a resistor 567. Said control electrode 566 is negatively biased to cut off the inverter valve by returning to a negative potential of approximately 150 volts through a grid resistor 568. The inverter valve 565 has its cathode 569 linked to the cathode 562 of the amplifier valve 560, and its anode 570 returned through an anode resistor 571 to a positive potential. Anode resistor 571 is joined to the junction point of voltage dividing resistors 572 and 573 which return to a positive potential of approximately 150 volts and to the ground reference potential, respectively. Anode 570 is also joined to the right-hand member and left-hand contacting member, respectively, of the backward relay contacting groups 303b and 303c.

If a balance point signal is not received by the control electrode 552 of the detector valve 553, this valve remains non-conductive. The voltage applied to the control electrode 561 of the amplifier valve 560 is such that the said valve is maintained in a conductive state. The voltage drop across the capacitor 559 is equivalent to that which results across the anode resistor 549 from the grid current drawn by the control electrode 561 of the amplifier valve 560. When a balance point signal appears upon the control electrode 552 of the detector valve 553, the control electrode 552 swings sufficiently positive during a portion of its cycle to make the detector valve 553 conductive during such periods. This balance point signal may have a frequency of 120 C. P. S. or 30 C. P. S. depending upon whether a read (write) or rewind operation is being performed. Conduction of the detector valve 550 results in a negative voltage excursion of the anode 558 charging capacitor 559. When charging capacitor 559 is sufficiently charged after signal excitation is applied to the control electrode 552, the voltage upon the anode 558 is reduced delivering a lower voltage to the control electrode 561 of amplifier valve 560. The voltage reduction on the control electrode 561 is such that valve 560 is cut off and a positive signal is delivered to the control electrode 566 of the inverter valve 565 making it conductive. The time constant for the discharge of capacitor 559 is of sufficient duration to prevent conduction of the amplifier valve 560 when the signal input to the detector valve 553 executes the negative portion of its cycle. The valve 560 regains conduction only after the balance point signal has been removed long enough to allow the required discharge of capacitor 559. The discharging time constant is about 25 milliseconds. In a specific instance, using valves of the type commercially designated 6J5 for valves 553, 560 and 565, the use of the following component values has been found satisfactory:

| | |
|---|---|
| Resistor 549 | 470,000 ohms |
| Capacitor 559 | .047 microfarad |

Thus, the detector valve 553 maintains a reduced voltage upon the control electrode 561 in response to an alternating current balance point signal. This reduced voltage causes the amplifier valve 560 to deliver a positive-going signal output and the inverter valve 565 to deliver a negative-going signal output. The amplifier valve circuit and the inverter valve circuit are so designed that the signal voltage delivered by the amplifier valve 560 when conducting is equal to the signal voltage output of the inverter valve 565 when it is conducting. Similarly, the output signals for the non-conductive states of the amplifier and inverter valves 560, 565 are equal.

The armature of the backward relay contacting group 303c when in its de-energized position serves to connect the anode 564 of the amplifier valve 560 to the control electrode 576 of a balance point valve 575 through a resistor 577. The armature of the backward relay contacting group 303b when in its de-energized position serves to connect the anode 570 of the inverter valve 565 in a like manner to a respective balance point valve of the right loop control in the servo loop device. When the backward control relay is actuated the following interchange is effected: The control electrode 576 of the valve 575 is joined to the anode 570 of the inverter valve 565, while a control electrode of the respective balance point valve of the right loop control is now joined to the anode 564 of the amplifier 560.

A resistor 579 and a rheostat 580 return the armature of the backward relay contacting group 303c to zero potential and are series connected with either the anode resistor 548 or the anode resistor 571, depending upon whether the backward relay is energized. The value of the rheostat 580 can be varied by a shorting arm permitting the adjustment of the voltage drop across the resistor 579 and rheostat 580. This voltage is delivered to the control electrode 576 of the balance point 575 through the resistor 577.

A clamping diode 578, which is normally conductive when the backward relay is de-energized, has its cathode connected to the armature of the backward relay contacting group 393c. Its anode is returned to the contacting arm of a potentiometer 582 which has one end returned through a resistor 581 to a positive voltage of approximately 120 volts while its other end is returned through a resistor 583 to a potential of zero volts. The minimum voltage below which the cathode of the clamping diode 578 will not be allowed to drop is adjustable by varying the arm position of the potentiometer 582. When the arm of the potentiometer 582 is moved to a more positive contact position, the clamping voltage is raised, whereas when the arm contacts a less positive position, the clamping voltage is correspondingly lowered.

An integrating capacitor 584 is also joined to the control electrode 576 of the balance point valve 575 bridging said grid to zero potential and being charged through the resistor 577 for delivery of an integration signal to the control electrode 576. For example, before the balance point signal is applied to the detector valve 553, the control electrode 576 of the balance point valve 575 is maintained at its lower voltage limit by the conduction of clamping valve 578. When a balance point signal is received by the detector valve 553 the amplifier valve 560 is cut off. Thereby, the voltage at the anode 564 of valve 560 rises, clamping diode 578 is extinguished, and integrating capacitor 584 is charged through the resistor 577. Thus, as the charge upon the integrating capacitor 584 increases, the voltage upon the control electrode 576 likewise increases. Upon the removal of the balance point signal and the delivery of the reduced positive signal from the anode 564 of the amplifier valve 560, the integrating capacitor 584 is caused to discharge and a decreasing voltage which corresponds to the discharge voltage of the capacitor 584 is impressed upon the control electrode 576 of the balance point valve 575. When the voltage upon the control electrode 576 of the balance point valve 575 decreases, the voltage upon the control electrode of the right loop control balance point valve (which receives excitation from the inverter valve 565) increases, decreasing when the voltage upon control electrode 576 increases.

The cathode 585 of the balance point valve 575 is returned to zero potential through a cathode resistor 586 and the anode 587 of the same valve is linked to the anode 589 of a loop sensing valve 588 which receives a varying signal conditioned by the left selsyn 71 upon its control electrode 590.

A fifty volt R. M. S. 800 C. P. S. signal is delivered to the input windings of the selsyn 71. In this case a conventional selsyn is used. Power is delivered to only two of the three input leads, so that, in the event the input windings are connected in a star, two of the windings will be connected in series; or, if the selsyn input windings are connected in delta, two of the windings will be series connected with each other and connected in parallel with the third. In effect, the input selsyn winding may be represented as a single input winding 602. One end of the secondary winding or signal output winding 604 of the selsyn 71 is connected to the junction point of series resistors 600 and 601 bridging the selsyn input winding 602, and the other end is joined to the anode of a peak detecting diode 605 whose cathode is returned to a negative potential of approximately 150 volts through a resistor 606. The cathode of the peak detecting diode 605 is also returned to zero potential through a filter input capacitor 607 and is coupled to the control electrode 590 of the loop sensing valve 588 through a resistor 608. This control electrode 590 is returned to zero potential through a filtering capacitor 609 which, in combination with the resistor 608, forms a section of a high pass filter whose function is substantially to reduce or eliminate 800 cycle per second signal frequencies.

In the selsyn, when the input winding 602 is energized, the signal upon the output winding 604 depends upon the position of the output winding 604 which is capable of relative motion with respect to the input winding 602. In a given position the signal output of the winding 604 may be found to be at a minimum and practically negligible. If the relationship between the windings 604 and 602 is now altered, by rotating the signal output winding 604 relative to the input winding, signal output increases in amplitude until a maximum signal amplitude is obtained, let us assume after a rotational displacement of approximately 90°. If the output winding 604 is rotated in the opposite direction from the said point of minimum signal output, the output signal will also increase until a maximum signal amplitude is achieved for approximately 90° rotational displacement in this direction. However, in the latter case the signal output is 180° out of phase with the signal output obtained in the former case.

A reference 800 C. P. S. signal of approximately 25 volts R. M. S. is supplied to the output winding 604 of the selsyn 71 by connecting one end to the junction point of the resistors 600 and 601. By this means the signal induced in the output winding 604 by the input winding 602 modulates the reference signal so that when the selsyn output winding 604 is rotated past the minimum signal coupling point the signal output continues to increase or decrease while passing through said point. This eliminates delivery of a signal increasing in amplitude on either side of the point of minimum coupling. This effect is achieved because the 180° shift in phase of the induced signal when passing through the point of minimum coupling has the effect of continually increasing or decreasing the reference signal when added thereto. Thus, relatively linear signal amplitude output is achieved through a rotational angle of 180°, whereas without the use of such a reference signal an angular displacement of no more than 90° could be utilized.

The capacitor 607 is charged through the peak detector valve 605 to a point where the voltage on the cathode of diode 605 is raised to the peak voltage appearing upon its anode. When the voltage upon the anode of the diode 605 is lower than the voltage upon its cathode, as for instance, during less positive portions of the signal cycle, current flows from capacitor 607 through the resistor 606 to decrease the voltage level upon the cathode. This is necessary so that the cathode voltage may be capable of detecting the positive peak voltage upon the anode of the diode 605, for otherwise the cathode would remain more postiive than the anode if the peak anode voltage were decreasing, thereby failing to respond to the downward trend.

As already noted, the voltage appearing upon the anode of the peak detecting diode 605 is determined by the rotational orientation of the output winding 604 with respect to the input winding 602, as signal modulation occurs with the rotation of the output signal winding 604. The value of the resistor 606 associated with the charging capacitor 607 is chosen to make the discharge rate of said peak charging capacitor 607 high enough to allow sufficient reduction of the voltage across the capacitor 607 so that it can effectively follow the most rapid rate of decline of peak voltage delivered by the output winding 604 of the selsyn 71. The maximum rate of peak voltage decline is limited by the time necessary for physical actuation of the output winding 604. In a specific instance, use of the following component values has been found satisfactory.

| | |
|---|---|
| Resistor 606 | 10 megohms |
| Capacitor 607 | .03 microfarad |

The filter section, comprised of filtering capacitor 609 and resistor 608, filters out the voltage fluctuations occurring from one peak reading to another, and delivers an average D. C. signal which increases and decreases with the trend of peak signals received by the charging capacitor 607.

The loop sensing valve 588 has its cathode 610 returned to zero potential through a cathode resistor 611 which is paralleled by a differentiating capacitor 612. The anode 589 of the loop sensing valve 588, linked to the anode 587 of the balance point valve 575, is joined to the cathode 615 of a buffer valve 614. Buffer valve 614 is normally conductive and has its control electrode 616 directly returned to a potential of approximately 120 volts and its anode 617 joined to a potential of 420 volts through an anode resistor 618. The signal upon said anode 617 also energizes the control electrode 621 of a signal output driver valve 620 through a grid resistor 619. The driver valve 620 has its anode 622 directly linked to a positive potential of approximately 420 volts and its cathode 623 returned to zero potential through a cathode resistor 624 and is also joined to a signal driving line 625.

The anode current of the balance point valve 575 and the anode current of the loop sensing valve 588 are both received through the buffer valve 614 from the 420 volt source of potential through the anode resistor 618 as anode current, or, from the 120 volt source of potential, through the control grid 616 as grid current. The voltage on the cathode 615 of the buffer valve 614 is maintained within restricted limits, so that there are no large voltage variations on the anodes of the balance point valve 575 and the loop sensing valve 588. For the purpose of this consideration, therefore, the voltage may be regarded substantially constant. The lower voltage limitation of the cathode 615 of the buffer valve 614 is the voltage on the control electrode 616. If the cathode 615 attempts to go below this value the control electrode 616 becomes positive with respect to the cathode 615 causing the flow of grid current to the cathode 615 which tends to prevent or minimize the amount by which the cathode swings negatively. The absolute upper limit of voltage upon the cathode 615 of the buffer valve 614 is the cut-off point. As the cathode 615 becomes more positive the control electrode 616 becomes more negative with respect thereto. This reduces the flow of current to the cathode 615 and tends to decrease the voltage thereon. The cathode 615 never goes so positive that the valve 614 is cut off, for if that were possible, the contradictory result would appear in that the current flow to the cathode 615 would be cut off which would result in the maximum possible reduction of voltage thereon.

The current passing through the cathode 615 depends upon the respective voltages on the control electrodes 576 and 590 of the respective valves 575 and 588. For example, as the voltage on the control electrode 576 of the balance point valve 575 goes more positive the anode current increases. The balance point valve 575 is self-biasing by virtue of the cathode resistor 586 so that, when the current therethrough increases due to a positive-going signal upon the control electrode 576, a voltage drop across the cathode resistor 586 also rises, maintaining proper biasing. If for the moment, the anode current received by the loop sensing valve 588 is constant, then the increasing current received by the anode 587 of the balance point valve 575 is delivered by the cathode 615 from the anode 617 of the buffer valve 614 through the anode resistor 618. The voltage drop across said anode resistor 618 increases to cause delivery of a negative-going signal to the control electrode 621 of the driver valve 620. It will be remembered that grid current will not be drawn through the buffer valve 614 unless the cathode 615 becomes negative with respect to the control electrode 616 which occurs when high currents are drawn by the valves 575 and 588. In this respect the buffer valve 614 is in the nature of a clamping diode supplying current and maintaining a minimum voltage level. Furthermore, the buffer valve 614 provides a means whereby current signals through the anodes of valves 575 and 588 are combined or effectively mixed to produce a composite voltage signal output at the anode 617 of the buffer valve 614. This use of the buffer valve 614 allows the utilization of a high impedance load resistor 618 providing a desired voltage amplification, while adequate current is still provided for the valves 575 and 588 without appreciable variation of voltage upon their anodes.

As previously considered, the clamping diode 578 determines the lower limit of voltage delivered to the control electrode 576 of the balance point valve 575. When a balance point signal occurs, the voltage upon the control electrode 576 increases as the charging capacitor 584 of the integrator circuit is charged. When the anode current of the balance point valve 575 increases with the positive swing of control electrode 576, more current is drawn through the anode resistor 618 of the buffer valve 614. The negative-going voltage upon the anode 617 of the buffer valve 614 is delivered to the control electrode 621 of the driver valve 620 which effects the delivery of a lowered voltage to the signal driving line 625.

The Figure 7 describes the operating characteristics of the mixing circuit with regard to the loop sensing valve 588; let it be assumed that the signal voltage on the control electrode 590 is represented by the input voltage curve of Figure 7. As the control electrode 590 swings positively the anode current through the loop sensing valve 588 increases. The capacitor 612 which is in the nature of a differentiating element by the effect it produces, causes the valve 588 to draw additional current over and above that which would flow in the absence of the capacitor 612. This additional current is drawn because the self-biasing of cathode resistor 611 cannot be effected until the differentiating capacitor 612 has been charged sufficiently to permit the normal operation of the cathode biasing resistor 611. Thus, when the control electrode 590 is going positively the additional current required by the differentiating capacitor 612 is determined by the rate of change of the signal upon control electrode 590. The charging current curve of Figure 7 illustrates this characteristic: the charging current increases to a constant rate, and remains constant for the time during which the slope of the input voltage curve (grid 590) remains constant, and decreases to zero when the slope of the input voltage curve is zero. Conversely, if the voltage upon the control electrode 590 decreases the current decline through the loop sensing valve 588 will be greater than it would be in the absence of differentiating capacitor 612. This is because the voltage across the cathode resistor 611 does not immediately follow the control electrode voltage downward, and is momentarily maintained by the so-called differentiating capacitor 612 which is caused to discharge through the cathode resistor 611. This resistor 611 must have a value sufficiently low so that the differentiating capacitor 612 is not unduly delayed in discharging therethrough. Thus, when the voltage upon the signal electrode 590 is increasing, additional current is supplied to the loop sensing valve 588; this corresponds to the addition of a positive differential value. However, when the signal voltage upon the control electrode 590 is decreasing, the current delivered to the valve 588 is decreased beyond the corresponding value of control electrode voltage decline; this corresponds to the addition of a negative differential value.

Additional current is supplied by the flow of grid current through the control electrode 616 of the buffer valve 614 to assure that the charge of the differentiating capacitor 612 is not unduly delayed during a rapid rise of the voltage upon the control electrode 590 which requires high charging currents for the capacitor 612. Although the flow of grid current does lower anode current by limiting the negative excursion of the cathode 615, it does not prevent increased anode current conduction by the buffer valve 614 through the anode 617 increasing the voltage drop across the anode resistor 618. However, as will be seen later, the voltage variations beyond a given point in the extreme regions are not particularly important. The supply of current by the grid cannot be considered disadvantageous because the circuit is designed so that grid current of the buffer valve 614 will be drawn only for certain high current requirements and not during the normal range of current operation. For instance, the grid current of valve 614 will be drawn when high currents are required for charging the differentiating capacitor 612.

This arrangement is clearly advantageous for allowing a proper differentiating action and for forming and combining current variations to produce a composite voltage varying output signal which is graphically illustrated by the output voltage curve of Figure 7. It may be observed that this output voltage curve is composed of a curve following the input voltage added to the charging current curve of Figure 7. It is to be understood that the output voltage curve shown in Figure 7 is of a signal derived only from the loop sensing valve 588; the effect of current variations through the balance point valve 575 has not been taken into account, the current through the valve 575 having been considered constant. The variations through the valve 575 produce an effect additional to that produced by the valve 588, so that the output voltage signal will have combined therein an output voltage signal also derived from the variations in current through the valve 575. Thus, mixing or adding the input signals to the valves 575 and 588 plus a differential signal of the input signal to grid 590 is effectively achieved.

The output voltage signal on the anode 617 of the buffer valve 614 is delivered to the driver valve 620, and causes the production of corresponding voltage variations upon the signal driving line 625. The signal driving line 625 deriving its signal from across the cathode resistor 624 of relatively low value, is a signal driving line of low impedance minimizing the transmission of noise signals and other interfering effects.

The signal driving line 625 is connected with the power control circuit 327. It will suffice to describe in detail the power control circuit 327, without so describing the power control circuit 337, also illustrated in Figure 10, which is connected with the respective signal driving line of the right loop control, since both circuits are identical.

The terminals 630 and 631 supplying 60 cycle, 110 volt A. C. from the unit power supply are bridged by a rheostat 632 joined in series with a resistor 633 and capacitor 634. The junction point of the rheostat 632 and resistor 633 is joined to the terminal 631 by means of a capacitor 635. The capacitor 634 is connected across series connected input windings 638 and 639 respectively of a signal input transformer 636 in the power control circuit 327 and a signal input transformer 637 of the right loop power control circuit 337.

The phase of the signal delivered to the input windings 638 and 639, with respect to the alternating signal appearing on the supply terminals 630 and 631, may be adjusted by varying the pisition of the movable arm of the rheostat 632 in the phase shifting network which arm joins terminal 630.

The signal input transformer 636 has two output windings 641 and 642, the output winding 641 having one of its ends coupled to the control grid of a gaseous or thyratron valve 644 through a grid resistor 643; this end of said winding 641 is also joined to the cathode of the power control valve 644 by means of a filter capacitor 645. In a like manner the other end of the output winding 641 is joined through a grid resistor 646 to the control electrode of a second thyratron type power control valve 647; it is also linked to the cathode of the valve 647 through a filter capacitor 648. The anodes of the valves 644 and 647 are joined by connecting to the ends of portions 650*a*, 650*b*, respectively, of the center tapped winding 650 of the power control transformer 649, having an input winding 652. The center tap 651 of the winding 650 is joined to the cathodes of the power control valves 644 and 647.

One end of the signal output winding 642 of the signal transformer 636 is connected through a grid resistor 653 to the control electrode of the thyratron valve 654, and is joined to the cathode of said valve 654 through a filter capacitor 655. In a similar manner, the other end of the winding 642 is linked with the control electrode of a thyratron valve 657 through a grid resistor 656 as well as with the cathode of said valve 657 through a filter capacitor 658. The anodes of the valves 654 and 657 are joined by connecting to the ends of portions 660*a* and 660*b*, respectively of a signal output winding 660 of a power control transformer 659, having an input winding 662. The center tap 661 of the output winding 660 is directly linked to the cathodes of the thyratron valves 654 and 657.

The signal driving line 625 is connected to the junction point of resistors 665 and 666, which are series connected bridging across the signal output winding 641, and is also joined to the cathodes of the power control valves 654 and 657. The cathodes of the power control valves 644 and 647 are joined to a reference potential by connecting to an adjustable tap of a voltage dividing resistor 670. A reference potential of a lower value is also supplied to the junction point of resistors 667 and 668 connected in series across the signal output winding 642. The voltage dividing resistor 670 which is connected in parallel with the voltage dividing resistor 671 associated with the power control circuits of the right loop control, has one end connected to a positive potential of approximately 410 volts through a series resistor 672 and the other end returned through a series resistor 673 to positive potential of approximately 120 volts.

One lead of each of the input windings 652, 662 of the power control transformers 649, 659 is returned to the power terminal 674 of the terminals 674, 680 receiving 60 cycle per second 110 volts alternating current from the unit power supply, through the main interlock contacting group 260*f* when in its energized position. The remaining two leads of the input windings 652, 662, respectively, of the power transformers 649, 659 are respectively joined to the motor windings 676 and 678 of the left reel motor 101 by means of the rheostats 675 and 677. The two ends of the motor windings 676, 678 joined with the transformer windings 652, 662, respectively, are coupled to a phase shifting capacitor 679, and the other ends of said motor windings 676, 678 are directly returned to the power supply terminal 680.

Power for the right reel motor 105 is supplied by the power supply terminals 674 and 680 through the main interlock contacting group 260*e* in a similar manner.

Considering first the operation of the power control thyratrons 644 and 647, a sixty cycle per second signal is delivered to each control electrode of the valves 644 and 647. Since the signals are being derived from opposite ends of the signal output winding 641 they are 180° out of phase with each other. Sixty cycle alternating current voltage is then supplied to the anodes of the power control valves 644, 647 through the power control transformer 649 when the main interlock relay contacting group 260*f* is energized. The alternating signals upon the anode of the valve 644 are 180° out of phase with the signals upon the anode of the valve 647, because each anode is connected to a different end of the power winding 650. The phase relationship of the alternating signals upon the anode and control electrode of power control valve 644, as well as of the valve 647, is adjusted by varying the rheostat 632 of the phase shifting network so that the signal upon the control electrode lags the signal upon the anode of the particular valve by a phase angle of approximately 90°. It is easily seen that, when the phase relationship is properly adjusted for the power control valve 644, the proper phase relationship of the said signals is also established for the power control valve 647. A phase relationship identical to that established in the valves 644 and 647 is effected between the anode and control electrode signals of the power control valves 654 and 657. In both instances, anode voltage leads the control electrode voltage by a phase angle of approximately 90°.

The cathodes of the power control valves 644 and 647 are returned to a reference potential by connecting to a voltage tap upon the voltage dividing resistor 670. Thus, a variable positive or negative bias may be exerted upon the control electrodes of the valves 644 and 647, with respect to their cathodes, for variations in the voltage upon the signal driving line 625 which is effectively coupled with the control electrodes of said valves. The voltage upon the signal driving line 625 determines when the valves 644, 647 are to become conductive and if so during what period of their positive anode voltage excursion they will conduct. Thus, if the potential upon the signal driving line 625 is sufficiently low, the 60 cycle alternating signal imposed thereon may not reach a sufficiently positive potential during the positive peak of the alternating signal to fire the valves 644, 647. As the signal upon the power driving line 625 becomes more positive, a point will be reached when the alternating cycle peak swings the control electrode voltage just sufficiently positive to cause conduction in the valves 644, 647. It is to be remembered that the related signals of the power control valves 644 and 647 are 180° out of phase, so that these valves are not conductive at the same time but only during periods that are 180° out of phase.

The reason for maintaining the phase shift of 90° between the anode and control electrode signal voltages can now be explained by the effect achieved as the signal upon the signal driving line 625 swings positively. The use of this phase shift and the varying signal upon the signal driving line causes the power control valves to be conductive for an increasing period during which positive voltage is applied to the anode (measured with respect to the cathode) as the voltage upon the signal driving line 625 goes more positive and, conversely, as this voltage becomes less positive. The maximum period during which one of the power control valves can be conductive is one-half cycle, this being the maximum period during which positive voltage is applied to its anode with respect to its cathode. When a control valve becomes conductive before positive voltage is removed from its anode, it will be extinguished as soon as positive voltage is removed from its anode. The period of control valve conduction is, therefore, determined by the point at which the said valve is fired during the period of positive anode voltage with respect to the point of extinction of the control valve which is occasioned by the negative voltage upon the anode. As the voltage upon the signal driving line 625 increases, the firing point of the power control valves is respectively advanced until the point is reached where one control valve is conducting throughout the period of positive voltage upon its anode and its related valve is conducting during the entire period of positive voltage upon its anode, 180° out of phase, so that one valve is always conducting while the other is nonconducting.

A similar result is effected by the power control valves 654 and 657, which effectively have their control electrodes maintained at a reference D. C. potential while their cathodes effect variable biasing by connecting with signal driving line 625. In this case, neither of the valves 654, 657 is conductive when the potential upon the signal driving line 625 is sufficiently positive; increasing periods of conduction are obtained when the potential upon the line 625 decreases. For sufficiently low voltage upon the signal driving line 625 one valve will always be conducting when the other is nonconducting.

If the D. C. reference potential delivered to the cathodes of the valves 644 and 647 is properly adjusted, with respect to the reference D. C. voltage delivered to the control electrodes of the valves 654 and 657, for a given voltage upon the signal driving line 625, none of the valves 644, 647, 654, 657 will conduct. Adjustment may be made of the reference potentials, which will cause the power control valves 644 and 647 to become conductive upon a slight upward rise from the given or neutral potential upon the signal driving line 625, and will cause the valves 654 and 657 to become conductive upon a slight downward voltage excursion of the line 625. To initiate the conduction of either one pair of valves 644, 647 or the other pair 654, 657, the necessary change in voltage above or below the given neutral value on line 625 decreases as the reference potentials approach each other, such as when the taps upon the voltage dividing resistor 670 are moved to points of greater proximity. If the valves 644, 647, 654, and 657 are to remain nonconductive for a given neutral voltage upon the signal driving line 625, the minimum voltage between the taps on the voltage dividing resistor 670 cannot substantially be less than the peak to peak voltage of the sixty C. P. S. signal offered by the signal output windings 641, 642 of the signal input transformer 636.

The filter capacitors 645, 648, 655, and 658 effectively bypass 800 C. P. S. signal on the signal driving line 625 not previously removed, preventing the exertion of such signals upon the control electrodes with respect to their cathodes of the respective valves. The said filter capacitors, however, do not substantially bypass sixty C. P. S. signals entering the control electrodes of the power control valves.

When the voltage upon the signal driving line 625 is such that the power control valves 644, 647, 654, 657 are all nonconductive, the output windings 650 and 660, respectively, of the power control transformers 649 and 659 are connected to a relatively high impedance load. The high impedance is effectively reflected by transformer action into the input or primary windings 652 and 662, respectively, of the power control transformers 649 and 659. Thus, a high impedance is effectively inserted in series respectively with the motor windings 676 and 678 preventing current flow through the windings to keep the reel motor 101 inoperative. Take the instance wherein the motor control valves 644 and 647 are conductive; as when the voltage upon the signal driving line 625 has been increased sufficiently. When either of the power control valves 644 or 647 is conductive an extremely low impedance load is effectively connected across the output winding 650 of the power control transformer 649, resulting in the reflection of a low impedance in series with the motor winding 676 allowing current flow therethrough. Current is also delivered to the motor winding 678 passing through the capacitor 679 which causes the current therethrough to be shifted in phase with respect to the current through the motor winding 676. The current through the winding 678 leads the current through the winding 676, and causes the left reel motor 101 to rotate and unreel the tape 32 carried by the left storage reel 31 (Figures 1 and 2). The rheostat 675 in the path of current flow acts to increase or decrease the current passing through the windings 676, 678 and thus determines the power delivered by the left reel motor 101 when actuated in the reel out direction.

When the voltage on the signal driving line 625 is below the given neutral point and the power control valves 654 and 657 are conducting a low impedance is reflected in series with the motor winding 678 allowing current flow therethrough. Current also passes through the motor winding 676 by means of the capacitor 679. Capacitor 679 causes this current to lead the current through the winding 678. With this arrangement the motor rotates in a direction opposite to that effected when the current is directly received by the motor winding 676. Thus, the valves 654 and 657 reel in tape whereas the valves 644 and 647 when conducting effect reel out the tape. The rheostat 677, which is in the current path during a reeling-in operation, controls the current and, thereby, the power delivered to the left reel motor 101 during reeling-in. During a reeling-in operation, the power requirement is greater than during a reeling-out operation, because during reeling-out, the reeling motor is rotating to supply tape in the direction of loop tension, while when reeling in the motor operates against loop tension. The adjustments of rheostats 675 and 677 are also made with respect to adjustments of the two rheostats associated with the right reel motor 105. For example: When the left reel motor 101 is reeling out, the right reel motor 105 must be made to reel in the tape at a rate corresponding to the reeling-out operation. When the left reel motor 101 is reeling in tape, the right reel motor must have its power delivery adjusted so that tape is reeled out at the proper rate.

From the preceding description of the power control circuit 327, it is evident that the speed, direction, and rotation of the reel motors 101, 105 may be effectively controlled by the positive signal delivered over the signal driving line 625. Thus, when the voltage on line 625 is much below the neutral point the power control valves 654 and 657 will be fully conducting to supply full power to the left reel motor 101 in the reel-in direction. As the voltage on the line 625 approaches the neutral point, conduction of the valves 654 and 657 will be reduced. This effects a reduction in the average power delivered to the left reel motor 101, and affords greater control for small adjustments required by the left reel motor 101. When the voltage on the line 625 is at the neutral point, the left reel motor 101 will remain inactive. As the voltage on the line 625 rises above the neutral point, the valves 644 and 647 become increasingly conductive causing the left reel motor 101 to rotate in the reel-out direction, average power delivery being determined and increased to a maximum as the driving signal goes more positive.

It may be noted that the control exerted upon the right reel motor 105 is identical to that just described upon the left reel motor 101. The right reel motor 105 is inactive when its corresponding driving signal is at its neutral point, and reel-in rotation is effected for voltages below the neutral point and reel-out rotation is effected when the driving voltage is above the neutral point.

Consider now the operation of the servo loop control device as related to the tape reeling apparatus disclosed and described in connection with Figures 1, 2 and 3. First assume that the left reel motor 101 and the right reel motor 105 are both inoperative, neutral driving signals being supplied to their respective power control circuits. To determine the positions of loops 37 and 42 under such conditions with the apparatus set up for forward operation, reference is had to the position of the arms 70 and 80, respectively, of the selsyns 71 and 81. Left selsyn 71 must be positioned to deliver to the signal peak detecting diode 605 (Figure 6) a more positive signal than is delivered by right selsyn 81 to its corresponding peak detecting valve. This is so because a less positive signal is delivered to the balance point valve 575 through the backward control relay 303 than is delivered to the corresponding balance point valve of the right loop control; and also because the neutral driving voltages which are being delivered are substantially equal in both cases greater conductivity is required on the part of the loop sensing valve 588 to make up for the reduced conduction of the valve 575. The right loop control, whose balance point valve receives a more positive control electrode voltage, has its conductivity increased and requires a reduction in conductivity of its loop sensing valve to produce the required neutral driving signal. Figure 1 shows the selsyn arms 70 and 80 prior to delivery of balance point signal under these conditions, and shows the left selsyn 71 delivering an increased signal output and the selsyn 81 in position to deliver a decreased signal output. Clockwise rotation of arm 80 of selsyn 81 causes increased signal output as does counterclockwise rotation of arm 70 of selsyn 71.

It is now assumed that the apparatus is set up for backward operation and the balance point signal has not yet been delivered, the neutral voltage on the signal driving lines is achieved by a decreased signal output delivered by selsyn 71 and an increasing output delivered by the selsyn 81, effected by the clockwise rotation of the selsyn arm 70 and the clockwise rotation of the selsyn arm 80 corresponding to positioning the loop tensioning pulleys 35 and 40 in their backward balance point positions 35′ and 40′. This loop arrangement is effected when the apparatus is set up for backward operation because the energizing of the backward control relay 303 results in the delivery of a higher potential to the control electrode of the balance point valve 575 and lowered potential upon the control electrode of the corresponding valve in the right loop control.

The transition from one balance point position to another balance point position is effected through an integrator 577, 584 associated with the balance point valves of the right and left loop control. For example, when shifting from the backward balance point to the forward balance point, voltage upon the control electrode 576 of the balance point valve 575 gradually increases while that delivered to the balance point valve of the right loop control gradually decreases. The increased current through the balance point valve 575 results in a lowered control electrode potential in the driver valve 620 decreasing the voltage delivered by the driving line 625 to a value below the neutral point. This results in firing the power control valves 654 and 657 causing the actuation of the left reel motor 101 in the reel-in direction. Tape reel-in by the left reel motor 101 results in decreasing the size of the loop 37 which actuates the selsyn arm 70 lowering the signal voltage delivered by the selsyn 71. The decreasing positive signal delivered by the left selsyn 71 reduces the current flow through the loop-sensing valve 588 causing a positive voltage excursion upon the anode 617 of the buffer valve 614 effecting the delivery of an increasingly positive signal to the driving line 625. Thus, because of the servo loop (comprised of the left reel motor 101, the loop 37 and connecting means to the selsyn 71 and the left loop control circuit to the power control circuit) the voltage upon the driving line 625 continues to increase until the neutral point voltage is attained, at which time the loop 37 is shifted to the backward balance point position prior to center drive actuation.

In the same manner, when a lowered voltage acting through a servo loop is delivered to the balance point valve of the right loop control, a signal results on the driving line above the neutral point. This signal causes the right reel motor 105 to execute a reeling-out operation increasing the dimensions of the loop 42 to the point where the loop 42 is in its proper backward balance point position. At the same time, the right selsyn 81 delivers the increased signal output necessary to effect the decrease in driving line potential, so that the neutral point voltage is attained by the driving line whence the right reel motor 105 is again inoperative.

With regard to adjusting the balance point positions of the loops 37 and 42 it may now be seen that the clamping diode 578 determines the lower limiting position of the left loop 37, whose size decreases as the potential upon the anode is increased, and increases as the potential upon the anode is decreased. The upper position of the loop tensioning pulley 35, corresponding to the minimum size of loop 37, is adjustable by use of the potentiometer 580, an increase in its series resistance effecting a decrease in the size of loop 37, and a decrease in its series resistance resulting in an increase in the minimum size of the loop 37. Similar adjustments in the right loop control circuits likewise determine the minimum and maximum loop dimensions of the right loop 42: the limiting positions of the loop 42 are adjusted to correspond directly with the limiting positions of the left loop 37 as indicated in Figure 1.

When the backward control relay 303 is deenergized conditioning the servo loop control device for forward operation, transition in like manner to the reverse direction is effected, whereby the left loop 37 is increased to its maximum loop size position and the right loop 42 is decreased to its minimum loop size position shown by Figure 1. The transition time required to move from one balance point position to another is approximately .6 second.

Consideration is now had of the case where the loops 37 and 42 are set up for forward operation and the balance point signal is thereafter supplied to the servo loop control device. After the balance point signal has been received, a positive-going signal is delivered to the left loop control and a negative-going signal to the right loop control. Thus, another mechanism now operates to effect shifting from the instant balance point position to the other balance point position which corresponds to the backward balance point position before the balance point signal is received by the servo loop control device. However, in this case when shifting occurs due to the receipt of the balance point signals, actuation of the center drive motor 110 is also effected, which in removing tape from the left loop 37 and moving tape to the right loop 42 tends to increase the rate at which the balance point is shifted. The rate of increase of voltage upon the control electrode 576 of the balance point valve 575 is determined by its associated integrator 577, 584 which increases the conductivity of this valve at a slower rate than the conductivity of the loop-sensing valve 588 is decreased, due to the signal derived from selsyn 71 sensing the rapidly shrinking loop 37. For the resulting total decrease in current through the anode resistor 618, the voltage upon the driving line 625 increases above the neutral point causing more tape to be reeled out to limit the rate of shrinkage of the loop 37. The increased voltage also permits the acceleration of the left reel motor 101 to the extent that its speed will be sufficiently high for tape delivery to the center drive wheel 39 without further shrinkage of the tape loop 37 beyond the minimum loop size dimension. The significance of the integrator 577, 584 is in part here revealed, since it is apparent that without it, the left reel motor 101 would execute a reeling-in operation in an attempt to reduce the size of the loop 37 to its final decreased dimension immediately upon the appearance of the balance point signal. This defeats the object of allowing a sufficient period for acceleration of the left reel motor 101 in the reel-out direction so that operating speed may be attained after a given period. In fact, without the integrator, the left reel motor 101 would be accelerated in the opposite direction placing it in an even less favorable position compared with its inoperative state.

The constant displacement of tape by the center drive wheel 39 does not allow the neutral point voltage to appear upon the signal driving line 625, even though the voltage upon this line approaches the neutral point voltage. The difference between this voltage and the neutral point voltage is known as the velocity error signal. It is necessary to provide a driving signal upon line 625 which maintains the velocity of the storage reels for supplying and taking up tape displaced by the center drive wheel 39.

When the balance point signal is removed from the servo loop control device, the signal delivered to the control electrode 576 of the balance point valve 575 decreases at a rate determined again by the integrator 577, 584. However, the deceleration and stopping of the center drive motor 110 causes the enlargement of the left loop 37 and a dimensional decrease in the right loop 42 at a rate greater than the corresponding voltage change upon the control electrode 576 of the balance point valve 575. As a result, the left selsyn 71 delivers a more positive signal than is required to maintain the driving line 625 at its neutral point. The increased current flow through the anode 618 causes a voltage, which is below the neutral point, upon the driving line 625.

This voltage results in delivery of power corresponding to a reeling-in operation of the left reel motor 101, but in this case, where the left reel motor 101 is already executing a reeling-out operation, the reeling-in power acts as a brake decelerating the left reel motor 101. The deceleration of the left reel motor 101 continues until the motor stops rotating at which time the main loop pulley 35 has assumed its original position, namely, the position in which the loop 37 has reached its maximum dimension.

Although the operation has been discussed mainly with regard to the left loop 37, the right loop control circuits operate upon the same principles, acting reciprocally, so that the right loop 42 is enlarging when the left loop 37 is decreasing in size and the right loop is decreasing when the left loop is increasing in size.

With the backward control relay 303 energized and the loops 37, 42 positioned initially in the backward balance point position, reversed reactions on the part of the left loop 37 and the right loop 42 occur when the balance point signal is applied. The loop 37 increases in dimension and the loop 42 decreases in dimension to their limiting position, and conversely, when the balance point signal is removed. The principles of operation, however, are similar to those explained with regard to the first case considered.

The manner in which over-shooting, hunting, and instability of reel motors 101, 105 are minimized will now be considered. Referring again to Figure 7, the input voltage curve indicates the signal voltage input which is delivered by selsyns 71, 81 when it shifts from one output voltage to another output voltage in an attempt to attain a neutral driving line voltage. The addition of the differential signal to the input voltage signal results in an output voltage signal upon the driving line 625 which for approximately one-half its duration applies a positive acceleration while for the other remaining half period applies a negative accelerating signal, so that the reel motor 101, 105 will not overshoot or hunt about its proper state. The differentiating capacitor 612 is chosen so that this proper operational state is attained, the proper differential value required being a function of the frictional and other such effects upon the reel motors 101, 105. A similar effect is achieved when the input voltage to the grid 590 of the loop-sensing valve 588 decreases from a more positive value, in which case a negative differential signal is combined with the input voltage signal.

Greater stability in operation is also achieved when the balance point signal is being applied and removed at a rate allowing insufficient time for balance point shifting from one position to the other. The integrator 577, 584 associated with the left loop control and the integrator associated with the right loop control apply an averaged signal voltage to the respective balance point valves of the left and right loop controls tending to maintain the main loop pulleys 35, 40 in a position intermediate the initial and final operating positions.

To understand this more clearly, assume that the voltage on the integrating capacitor 584 has assumed an intermediate voltage between minimum and maximum voltage supplied to the control electrode 576 of the balance point valve 575, while the voltage on the control electrode 576 varies above and below this value as the balance point signals are applied and removed, and the backward control relay 303 is de-energized. As already explained, the reel motor 101 will be actuated in the direction necessary to cause the driving line 625 to assume its neutral voltage, thus, the loops 37 and 42 will assume positions corresponding to the signal on the control electrode 576 of the balance point valve 575 and the related valve of the right loop control. If the loop positions are considered to correspond to the average signal voltages on the balance point valves of the left loop control and right loop control when the signal on the control electrodes of the said valves are varying in the region close to this average point, the correction voltage, to wit, the voltage above or below the neutral point on the driving line 625, is sufficiently small so that full reel-out or reel-in power is not applied during such times. Thus, another advantage of the integrators associated with the balance point valves appears to be that when the balance point signal is applied and removed in rapid succession the voltages applied to the balance point valves being caused to vary in the region of an average value, greater operating stability is achieved. Without the use of the integrator, maximum power would be applied to the reel motors in one direction and shortly thereafter reversed for full power application in the other direction. In this connection, it must be remembered, that this advantage is achieved only because the power control circuits are capable of applying power which, within a given range, corresponds to the amount of error signal above or below the neutral voltage on line 625.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In a tape handling apparatus, a tape driving means having a relatively high accelerating-decelerating rate, a first tensioning pulley conducting upon its rotatable surface tape deliverable to said driving means and formed in a first loop capable of dimensional variation, a second tensioning pulley conducting upon its rotatable surface tape deliverable by said driving means and formed in a second loop capable of dimensional variation, a tension equalizing connection comprising an equalizing loop having its ends respectively joined to said first and second tensioning pulleys, a translating device comprising a spacing bar having an equalizing pulley supported at each end, each equalizing pulley conducting upon its rotatable surface said equalizing loop, a main tensioning means including a spring connected to the extremities of the spacing bar in said translating device to effect tensioning of said first and second loops, and tape storing units supplying tape for and removing tape from said tape driving means at an average accelerating-decelerating rate below that of said driving means and tending to maintain respective given dimensional variations and configurations of said first and second loops.

2. In a tape handling apparatus, a tape driving means having a relatively high accelerating-decelerating rate, a first tensioning pulley conducting upon its rotatable surface tape deliverable to said driving means and formed in a first loop capable of dimensional variation, a second tensioning pulley conducting upon its rotatable surface tape deliverable by said driving means and formed in a second loop capable of dimensional variation, a main tensioning device connected to said first and second tensioning pulleys applying respectively therethrough equal tensional force to said first and second loops, a first tape storing unit delivering tape to said tape driving means, a second tape storing unit removing tape from said driving means, said storage units operating at an average accelerating-decelerating rate below that of said driving means, first and second loop sensing mechanisms, a first link controlling said first storage unit conditioned by the actuation of said tape driving means and said first loop sensing mechanism, and a second link controlling said second storage unit conditioned by the actuation of said tape driving means and by said second loop sensing mechanism.

3. An electrical circuit controlling the dimensional variations and configurations of a loop formed in a portion of a flexible elongated member extending from a member supplying and storing unit to a member driving means comprising a signal transforming unit operatively connecting to a variable loop in a portion of a flexible elongated member and producing an output signal conditioned by a dimension of said variable loop, a detecting circuit producing a loop shifting signal when power is applied to a member driving means, a signal mixing circuit comprising a first element receiving the output signals of said signal transforming unit, a second element receiving integrated signals from said detecting circuit and an output element delivering a composite output signal, and a power control circuit comprising a plurality of gas discharge valves and power transformers responsive to the composite signal delivered from said signal mixing circuit.

4. In an electrical circuit controlling the dimensional variations and configurations of a first loop formed in a portion of a flexible elongated member extending from a first storing unit to a member driving means and a second loop in a portion of said member extending from said driving means to a second storing unit, a first control unit comprising a first loop sensing mechanism, a mixing circuit receiving excitation from said first loop sensing mechanism and a power control circuit responsive to said mixing circuit and energizing said first storing unit, a second control unit comprising a second loop sensing mechanism, a mixing circuit receiving excitation from said second loop sensing mechanism and a power control circuit responsive to said mixing circuit and energizing said second storing unit, a detector circuit energized by the actuation of the member driving means including a first signal output and a second signal output, and a switching device operatively connecting the first and second signal outputs of said detector circuit respectively to the mixing circuit of said first and second control units for the actuation of the driving means in one direction and interchanging the connection of said first and second signal outputs for actuation in the reverse direction.

References Cited in the file of this patent

UNITED STATES PATENTS

| | | |
|---|---|---|
| 1,265,328 | Henderson | May 7, 1918 |
| 1,304,565 | Henderson | May 27, 1919 |
| 1,848,663 | Robinson, Jr. | Mar. 8, 1932 |
| 1,853,663 | Cottrell, 3d | Apr. 12, 1932 |
| 1,886,663 | Field | Nov. 8, 1932 |
| 2,069,841 | Massonneau | Feb. 9, 1937 |
| 2,166,551 | Perry | July 18, 1939 |
| 2,292,511 | Ferm | Aug. 11, 1942 |
| 2,295,327 | Bendz | Sept. 8, 1942 |
| 2,325,381 | Edwards, et al. | July 27, 1943 |
| 2,363,684 | Montgomery | Nov. 28, 1944 |
| 2,419,476 | Begun | Apr. 22, 1947 |
| 2,487,755 | Few | Nov. 8, 1949 |
| 2,488,482 | Swarthout, et al. | Nov. 15, 1949 |
| 2,497,691 | Schroeder | Feb. 14, 1950 |
| 2,512,378 | Puchlowski | June 20, 1950 |
| 2,525,600 | Hornbostel | Oct. 10, 1950 |
| 2,543,028 | Kammer | Feb. 27, 1951 |
| 2,560,204 | Andren | July 10, 1951 |
| 2,576,074 | Nachtman | Nov. 20, 1951 |